United States Patent Office 3,738,828
Patented June 12, 1973

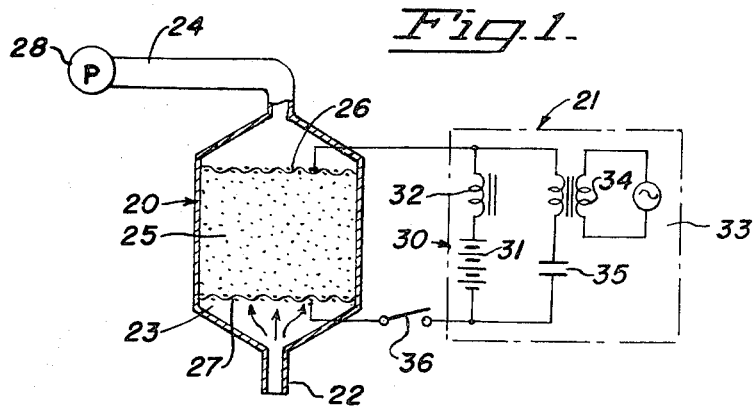
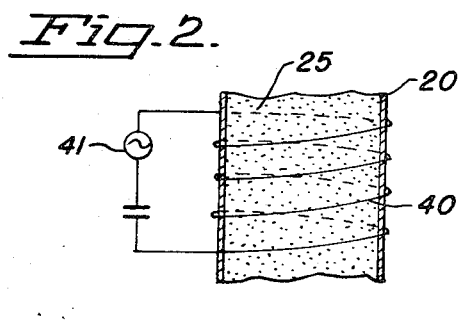
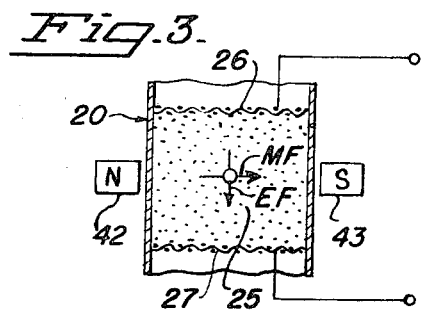
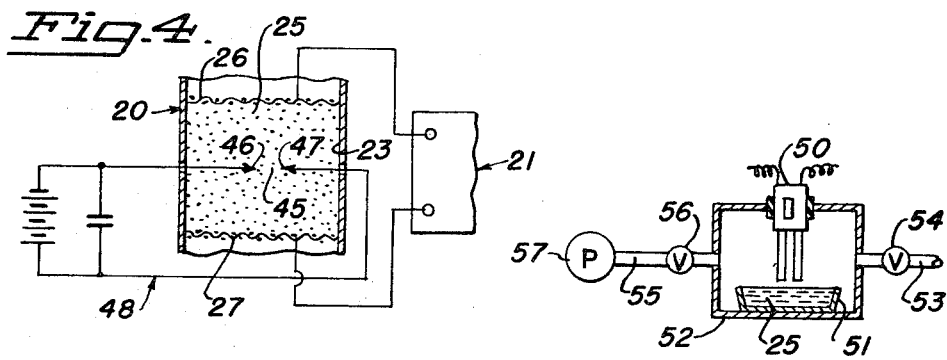
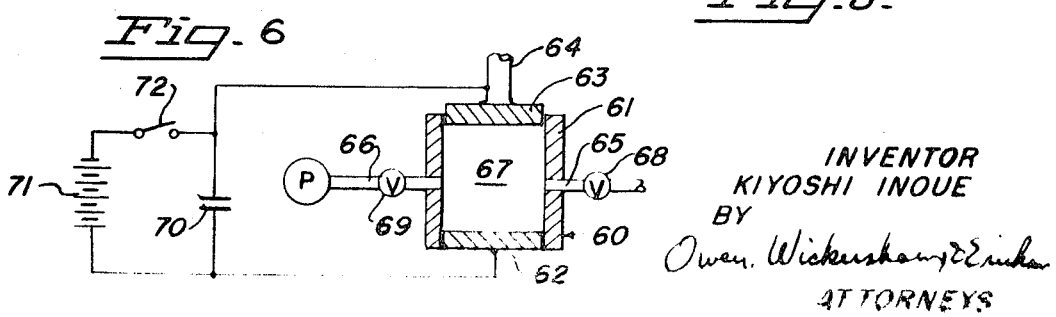
INVENTOR
KIYOSHI INOUE

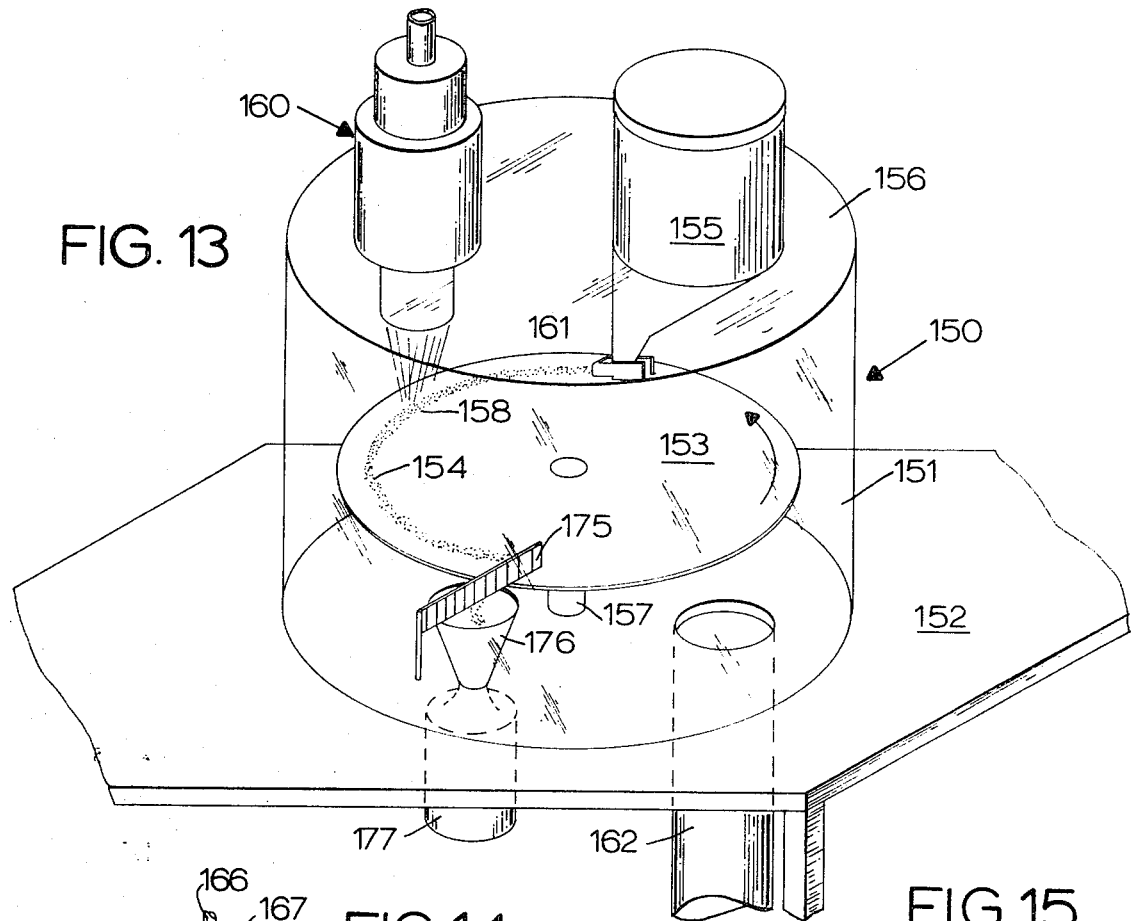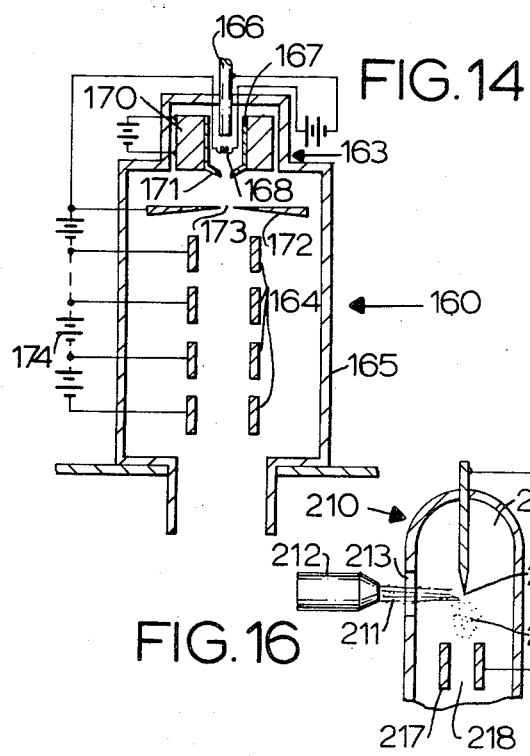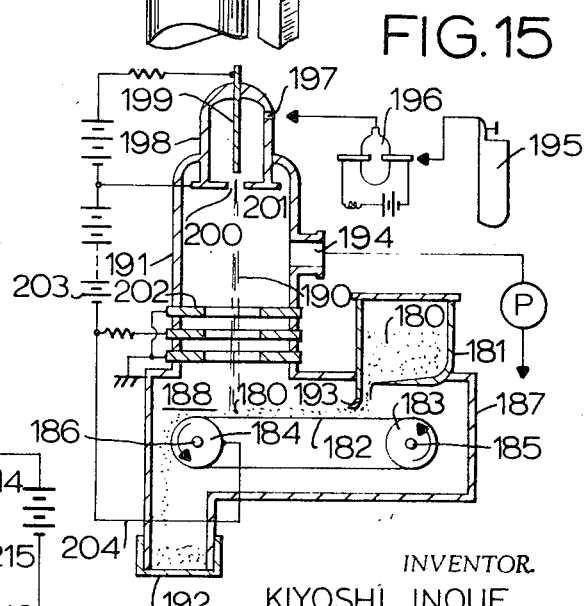

---

3,738,828
METHOD OF POWDER ACTIVATION
Kiyoshi Inoue, 16–8, 3-chome Kamiyoga, Tokyo, Japan
Continuation-in-part of application Ser. No. 692,960,
Dec. 22, 1967. This application July 31, 1970, Ser.
No. 60,070
Int. Cl. B22f 1/00
U.S. Cl. 75—211                                                                 16 Claims

ABSTRACT OF THE DISCLOSURE

A method for activation of metallic powders by subjecting the powder to bombardment with electrons, ions, or molecules in an inert or reductive atmosphere. Improved densities result in sintering, as do improved catalytic actions. Simultaneous pulverization of coarse particles or bodies is also achieved where desired. The pretreatment is, in some instances, combined with loading the activated particles directly into a mold, for compaction or sintering, preferably with some additional activation, all done in an integrated system.

---

This application is a continuation-in-part of application Ser. No. 692,960, filed Dec. 22, 1967, now Pat. No. 3,598,566.

This invention relates to metallic powder activation. More particularly, it relates to an improved method of and apparatus for the removal of impurities such as oxide film and moisture, as well as other contamination, from the surfaces of discrete metallic particles by utilizing impact energy. The result is to modify such surfaces to an activated powder that may be used for cold or warm pressing to form densified green compacts or for hot pressing to produce coherent sintered objects or for interparticle chemical reactions or for catalyst.

Conventionally, two powder activation processes have been available: (a) heating in a reductive atmosphere and (b) reaction with particular chemical agents. Each of these processes has had only limited efficiency.

The present invention comprises introducing powder into an inert or reductive atmosphere and there subjecting it to bombardment with high-energy impact force by electrons, ions, or molecules or combinations thereof.

Electron and ion bombardment for purposes of this invention may be effected through an electrical space discharge, e.g., corona or glow discharge, created through the inert or reductive medium between a pair of electrode or among adjacent or close discrete particles fluidized in the inert or reductive medium. Molecular bombardment, probably with some accompanying ion bombardment, may be accomplished by shock waves, such as result from detonation in a shock gun, as by spark generation of impulses.

I have discovered that the electron, ion or molecular bombardment advantageously removes oxide films, moisture, adsorptive gaseous particles and other impurities normally firmly adherent to and coated on the substrate of each discrete particle, apparently by decomposing these impurities into gaseous substances, thereby cleaning the surfaces of the particles. In addition to removal of the coated films by the action of such bombardment, marked increases of surface tension and free energy of the cleaned surfaces are achieved as a result of the formation of strain and distortion. By continuous circulation of the inert or reductive medium, i.e., its replenishment by introducing fresh inert or reductive gas into and evacuating the contaminated atmosphere from the treatment chamber in which the bombardment is effected, the decomposed gaseous impurities are prevented from recombining with the material forming the particle substrate.

In addition to removal of the coated films, marked increases of surface tension and free energy of the cleaned surfaces are achieved, and this action is especially remarkable with ions or heavy particles of suitably regulated energy. Thus, the beam particles act as high-energy impact media and strike atoms at the surface region of each particle substrate, and by scattering they thereby produce strain and distortion in the powder particles without fusion.

The power supply for the production of effective corona and glow discharge may be a source of DC, AC, DC-pulse or pulsating current. Experimentation has demonstrated that a high-frequency and unidirectional current is preferable in promoting powder activation. An electron beam or ion beam gun may be employed.

For many applications, it is preferred to use a beam of ions (i.e., heavy particles or particles of atomic or molecular size and mass) as a corpuscular beam for impact powder activation.

The invention is applicable not only to metal powders and to powders of metal alloys, but also, in some aspects to powdered metal oxides, other metallic compounds, and also to non-metals such as carbon.

A highly activated powder, which exhibits excellent performance in metallurgical, chemical or electrochemical utilization (i.e., in terms of metallurgical bondability, physical properties, chemical or electrochemical activity) is obtained by bombardment of corpuscular particles, especially ions or particles at least in part formed by ions, particles of atomic or molecular size and mass, which when they are imparted impact energy sufficient to form lattice defects (e.g., of Frenkel type) and accompanying lattice dislocations in the individual particles of powder.

In accordance with another aspect of the invention, simultaneously with activation, pulverization of relatively large-sized particles or bodies (wire, block, etc.) into smaller sized particles can be effected by means of impulses of discharge energy. For this purpose, fluidized powder may be held between a pair of electrodes in a non-oxidizing atmosphere so as to be subjected to interparticle discharges of impulsive character under the external application of a succession of impulses across the electrodes. Alternatively, a spark gap of relatively small spacing may be surrounded by floating powder so that upon the generation of impulse discharge at the gap, mechanical collisions may be induced among particles and propagated radially out from the spark gap. The particle size resulting from such pulverizing may be controlled by regulation of the discharge energy.

The present invention also provides an improved powder loading system wherein powder is pre-treated as described above, and is thereafter immediately loaded in a mold for compaction or sintering. Such a system offers the *opportunity* for further bombardment and purification during loading.

Other objects and advantages of the invention will appear from the following description of some preferred embodiments.

In the drawings:

FIG. 1 is a diagrammatic view of a system embodying the invention, including a treatment chamber shown in elevation and in section and an electrical circuit.

FIG. 2 is a fragmentary and diagrammatic view of a portion of a modified form of treatment chamber of the invention with a different means for applying the electrical circuit to the chamber.

FIG. 3 is a view similar to FIG. 2 of another modified form of the invention, employing a magnetic field in combination with the apparatus of FIG. 1.

FIG. 4 is a view similar to FIG. 1 of another modified form of the invention, employing a spark-discharge gap between the electrodes of FIG. 1.

FIG. 5 is a diagrammatic view of a portion of another modified form of the invention, employing an electron or ion beam gun.

FIG. 6 is a view similar to FIG. 1 of another modified form of the invention which also pulverizes material into small particles.

FIG. 13 is a view in perspective of another ion-beam treatment apparatus embodying the principles of the invention.

FIG. 14 is a view in section partly diagrammatic taken along the line 14—14 in FIG. 13.

FIG. 15 is a partly diagrammatic view in section of a modified form of ion-beam treatment apparatus embodying the principles of the invention.

FIG. 16 is a fragmentary view in elevation and in section of a laser-actuated ion beam gun.

Figure 7:
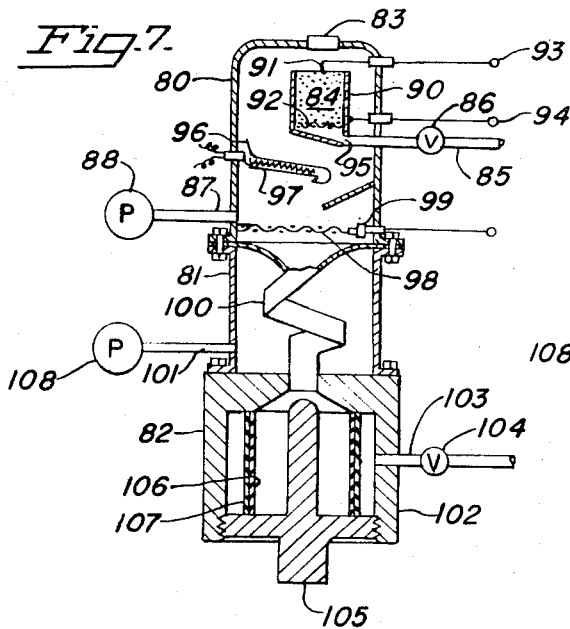
FIG. 7 is a diagrammatic view in elevation and in section of a modified form of the invention which provides an integrated system for both pre-treating the material and loading it into a mold, as for sintering.

The system shown in FIG. 1 comprises a treatment chamber 20 and a power supply 21. The chamber 20 is provided with an inlet 22 for introducing a non-oxidizing, i.e., an inert or reductive atmosphere into a treatment region 23 of the chamber 20 and an outlet 24 communicating with a conventional vacuum pump 28 for evacuating contaminated atmosphere from the chamber 20. A powder 25 to be activated is fluidized by the introduced gas within the treament region 23 and contained between retaining screens 26 and 27, which form a pair of electrodes for the electrical-discharge powder activation process.

The power supply 21 is connected across the screen electrodes 26 and 27 and, in this embodiment, comprises a source 30 of unidirectional current of relatively high amperage capable of effecting sufficient glow or corona discharge between the screen electrodes 26 and 27 (the source 30 may be a battery 31 in series with a high-energy coil 32) and a source 33 of high-frequency AC of relatively low amperage adapted to promote high-frequency discharge among the particles of the powder 25. The AC source 33 may be coupled to the DC source 30 and the electrodes 26 and 27 through a transformer 34 and a condenser 35. When discharges are developed between the electrodes 26 and 27 and among close discrete particles of the powder 25, through the gaseous medium, each of the discrete particles is subjected to electron and ion bombardments with resulting impact forces, thermal effect and induced interparticle collisions of relative particles. After sufficient activation of the powder 25, the power supply 21 may be disconnected from the electrodes 26 and 27 as by a switch 36.

In the modified system shown in FIG. 2 the chamber 20, which may be similar to that illustrated in FIG. 1, is surrounded by a winding 40 connected across a high-frequency AC or pulse source 41. In operation, the powder 25 is exposed to pole-less high-frequency discharge created through the inert or reductive atmosphere among discrete particles floating in that atmosphere.

FIG. 3 shows a modified system of the invention employing a magnetic field, either static or movable, either uni-directional or alternating, as across poles 42 and 43, in combination with the electrical field produced by the power supply 21 of FIG. 1. As shown, the magnetic field MF may be at right angles to the electrical field EF, and is designed thus to deflect the flow lines of bombarding electrons and ions or to induce additional movements of the discrete particles of the powder 25 when it is charged or magnetized, the exact operation depending on specific procedures desired to augment the activation effect.

FIG. 4 shows a modified system wherein a spark-discharge gap 45 is provided in the treating area 23 between screen electrodes 46 and 47, and a power supply 48 produces repeated impulses which are propagated through the surrounding inert or reductive atmosphere and the particles of powder 25 fluidized therein. Thus, shock-like mechanical interparticle collisions are caused which facilitate the effect of the electrodes 26 and 27. I have found that such mechanical-force impulses effectively impart distortions and strains to the surface of each particle, thereby giving storage of energy thereat that raises the surface energy. In this embodiment, however, the mechanical impulse source may be replaced by other means.

FIG. 5 illustrates yet another embodiment of the invention, in which an electron or ion beam gun 50 is substituted for the glow or corona discharge means described in previous embodiments. Powder 25 to be activated is placed in a container 51 within a treatment chamber 52, which is provided with an inlet duct 53 having a stopcock or valve 54 for introducing an inert gas into the chamber 52. An outlet duct 55 has another stopcock 56 connected with a vacuum pump 57 for maintaining the interior of the treatment chamber 52 at a predetermined low pressure. The container 51 for retaining the powder 25 may be vibrated at a sonic or ultrasonic frequency to agitate the powder 25 in a desired manner.

FIG. 6 shows an embodiment of the invention for effecting the pulverization of relatively large bodies, i.e. particles, wires, or chunks, into smaller sized particles, simultaneously with the activation thereof. In this system, a treatment chamber 60 is provided with a side wall 61 composed of insulating material such as ceramic, and a pair of electrodes 62 and 63, the electrode 63 being movable by a rod or a shaft 64. The side wall 61 of the chamber 60 is provided with an inlet 65 for supplying and an outlet for evacuating an inert or reductive atmosphere into and from the chamber 60, in which powder 67 is fluidized. An inlet valve 68 and an outlet valve 69 control flow. Connected across the electrodes 62 and 63 is a charge and discharge capacitor 70, which is connectable across a DC source 71 by a switch 72, for establishing a single impulse discharge or repeated impulse discharges in the chamber 60 between the electrodes 62 and 63. In practice, upon closing the switch 72 while maintaining the interior of the chamber 60 at a predetermined pressure, a spark discharge is developed across the electrodes 62 and 63. If the powder 67 is conductive material, it provides a conductive path to create dispersive spark discharges between adjacent or nearby particles. If the powder is of dielectric property, charges formed on discrete particles similarly cause the dispersion of electrical energy. In any case, the interparticle spark discharges thus created are sufficient to produce impact force due to electron and ion bombardments, thermal energy, and spark discharge pressure which, in combined fashion, decompose the contamination coated on the discrete particles of the material 67 and, in addition, pulverize these particles into smaller pieces, imparting to the smaller particles distortions or other energy storage. It will be apparent that the present embodiment affords particular advantage in the metallurgical field, in that only a single process is required to prepare activated powder from any raw material. As mentioned previously, the size of pulverized particles can be controlled by the amount of the discharge energy, the pulse width, and/or other discharge parameters.

FIG. 7 represents an integrated activation system and an improved powder-loading system, wherein the principles and steps of the above-described method are adapted to perform the activation of raw powdery material and also for loading the activated powder into a mold for compacting or sintering. The system essentially comprises three parts: an activation treatment chamber 80, an evacuation chamber 81 and a powder compacting unit 82. The powder compaction unit 82 in this case is shown to employ a so-called rubber press, although the system is adapted to any type of compaction or sintering process.

The activation chamber 80 is provided with a raw-material inlet 83, through which unactivated powder 84 is introduced, a gas inlet 85 with a valve 86 for delivering an inert or reductive atmosphere into the chamber 80, and a gas evacuating duct 87 communicating with a vacuum pump 88. A discharge treatment zone 90 is provided with a needle electrode 91 and a screen electrode 92 for exposing the fluidized powder 84 of raw material to corona and/or glow discharge in the manner described hereinabove, while inert gas comes in through the conduit 95. For this purpose, terminals 93 and 94 are supplied with any suitable discharge power supply.

After treatment by electron and ion bombardment in the zone 90, the powder 84 is fed to a heating stage 96, at which contamination, if any, remaining on the particles can be removed by heat emanating from a heater 97. Thereafter, the treated powder is fed to a vibrating screen 98, preferably equipped with a sonic or ultrasonic vibrator 99, which preferably sets up a frequency ranging from 100 Hz. to 200 kHz. The vibrating screen 98 forms means for separating contaminated or decomposed substances from the particles and also serves as a filtering means. The filtered-out particles and the decomposed and separated gaseous substances are then evacuated through the duct 87 by the vacuum pump 88. In this connection, the pressure within the activation chamber 81 can be reduced to $10^{-2}$ to $10^{-5}$ mm. Hg without decreasing activation efficiency.

Disposed under the vibrating screen 98 is a feeder tube 100, preferably having a spiral configuration, through which the activated powder is progressively fed. A conduit 101 may communicate with a vacuum pump 108 to keep the zone 81 also at a low pressure. The feeder 100 is preferably made porous, so that the powder passing therethrough may be completely de-gassed by the negative pressure in the zone 81 applied via the conduit 101. The lower end of the conduit 101 introduces the powder into the compaction unit 82.

The unit 82 in this instance may comprise an external vessel 102 provided with a fluid inlet 103 having a valve 104. A mandrel 105 forms a solid die, and one or more deformable membranes 106 and 107 form another die. The membranes 106 and 107 may be composed of natural rubber, synthetic rubber or other elastomeric material and, alternatively, may be deformable but non-elastic material. Upon sufficient loading of the powder that has been cleaned and activated in accordance with the present invention, hydraulic or pneumatic fluid may be introduced through the inlet 103 into the cavity formed by the side wall 102, the die 105 and the deformable membranes 106 and 107, to compress the loaded powder substantially isostatically.

Figure 8:
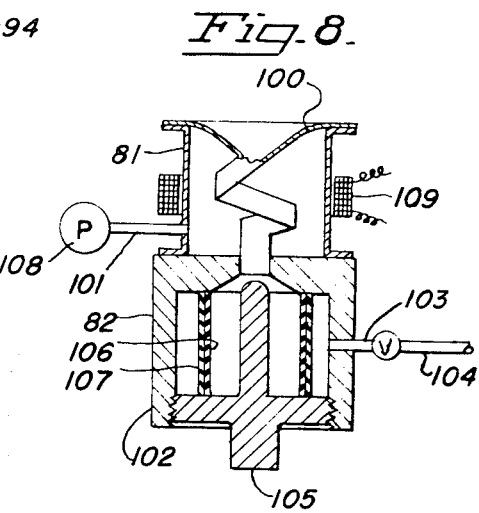
FIG. 8 is a fragmentary view of a portion of the apparatus of FIG. 7 with a modification of one portion thereof.

In FIG. 8 the system is the same as in FIG. 7, except that a magnetic field is applied by a magnet 109 to the activated powder in the evacuating zone 81 at the de-gassing stage, or at the loading stage. The magnetic field, whose strength may be in the range from 50 to 5000 gauss, depending on the specific application, is here provided to cause disturbance in the movement of the powder being fed along the spiral passage 100, thereby promoting inter-particle collision and repulsion, which further augment the de-gassing effect. The magnetic field is also advantageous to achieve closer packing of the loaded powder in the mold 83. This system is particularly suited for powders of magnetizable material.

Figure 9:
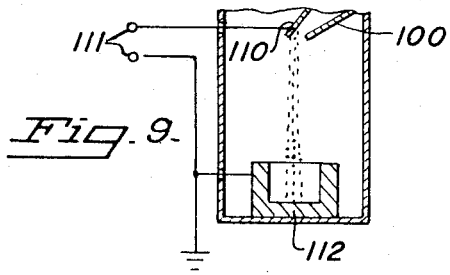
FIG. 9 is a diagrammatic view of a modified form of the bottom of the apparatus of FIG. 7.

FIG. 9 diagrammatically illustrates a special powder-loading system adapted to be used with the system of FIG. 7. In this embodiment, the outlet 110 of the feeder 100 is used to form an electrode connected to a power supply 111, for establishing an electrostatic field in the region where the activated powder is delivered under gravitational force into a mold 112 which forms the counterelectrode. The electrostatic field is used to precharge the powder passing through the outlet 110 of the feeder 100 with the accompanying electrical space discharge, here a corona discharge, and to accelerate uniformly the speed of the powder as it falls toward the mold 112 with increased coulomb force. Thus, the loading or piling state of the powder in the mold 112 can be controlled by the intensity of the electrostatic field.

Figure 10:
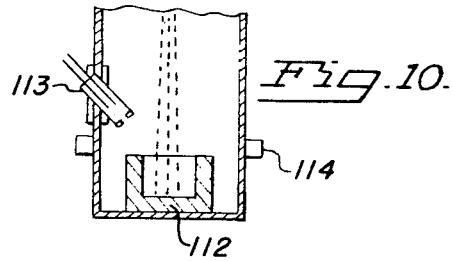
FIG. 10 is a view like FIG. 9 of another modified form of the bottom of the apparatus of FIG. 7.

FIG. 10 shows another powder loading system practicable with the present invention. This embodiment employs an electron or ion beam gun 113 for accomplishing additional powder activation when the powder is packed in the mold 112. A focusing coil 114 is used to accelerate the electron beam. It has been found that an electron beam of about 5 to 150 milliamperes and 5 to 150 volts is satisfactory.

Figure 11:
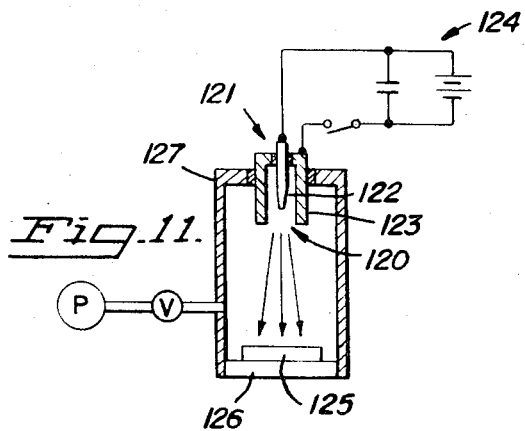
FIG. 11 is a diagrammatic view of a system also embodying the principles of the invention for treating the powder with a shock wave.

Another aspect of the invention shown in FIG. 11, involves the utilization of a shock wave or pressure for powder activation. In practice with the present improvement, a shock gun 120 is provided inside with an impulse spark generator 121 as a detonation source, comprising a needle electrode 122 and a tubular gun electrode 123 and a spark generator circuit 124. Opposite the gun 120 is a mass 125 of discrete particles or a solid body to be activated supported upon a retainer 126, such as a plate, all in an evacuated treatment vessel 127. Upon ignition, the gun 120 exerts impulsive pressure to the mass 125 to be activated. Alternatively, the discrete particles may be propelled by impulsive pressure to impinge with ultrasonic velocity on a rigid target. In either case, the resultant particles have shown high degrees of activation. Powder so treated, when subsequently sintered and used as a battery electrode, has shown high efficiency.

Figure 12:
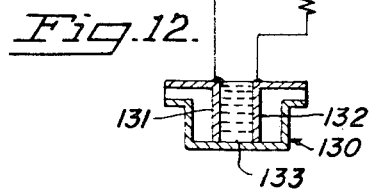
FIG. 12 is a diagrammatic view of a fuel cell in which material treated by the system of FIG. 11 may be used after sintering.

FIG. 12 shows a fuel cell 130 employing electrodes made from actuated particles, namely an electrode 131 of sintered silver for the oxygen electrode and an electrode 132 of sintered nickel for the hydrogen electrode. An electrolyte 133 lies in between.

The activation of powder by a high-energy ion beam, briefly described above may advantageously be accomplished with the apparatus 150 illustrated in FIG. 13. The apparatus 150 comprises a treatment chamber 151, which may be formed of a transparent material such as glass and mounted on a table 152. Within the chamber 151 is a rotary disk 153, which may, for example, be formed of tungsten, on which a powder 154 to be treated is continuously supplied from a hopper 155 shown extending through an upper wall 156 of the chamber 151. The disk 153 carrying the powder 154 is rotated on a shaft 157 by a motor (not shown). As the disk 153 rotates, the powder 154 supplied from the hopper 155 is fed in a layer to a treatment zone 158 to which a beam of ions is projected from an ion gun 160 extending through the upper wall 156 of the chamber 151. To insure an appropriate thickness of the powder layer 154 a metering dam 161 may be provided as shown. The chamber 151 is under a suitable vacuum pressure (i.e., $10^{-2}$ to $10^{-5}$ mm. Hg or less), maintained through a vacuum connection 162. A small vibration may be imparted to the disk 153 by well known vibrators, to provide more uniform surfaces of particles for ion impingement as the powder layer 154 passes under the beam gun 160. Also, the disk 153 may be formed with an internal cavity (not shown here) for circulation of a coolant fluid although such cooling is not always essential inasmuch as the powder 154 is caused to pass the treatment zone swiftly.

The ion gun 160 may be of a conventional form as shown in FIG. 14, having a duoplasmatron 163 and a lens system 164 mounted in a vacuum tight tube 165 which extends downwardly into the treatment chamber 151. In the duoplasmatron 163, an inert gas such as argon or xenon is introduced through a capillary 166 to the vicinity of a cathode 167 which is maintained at a moderate negative potential and heated by a filament supply 168. Surrounding the cathode is a solenoid 170 and an intermediate electrode 171 which together serve to provide a magnetic field to confine the ion plasma in well known manner. An anode 172 having a central opening 173 is located beyond the intermediate electrode 171 and in line with it and the cathode 167. The voltage between the anode 172 and the cathode 167 causes the gas to ionize, forming the positive gas ions. The gas ions are withdrawn from the duoplasmatron 163 and accelerated through the focusing lenses 164 under a high-voltage supply 174 and projected as a beam into the chamber 151 to impinge onto the layer of powder 154 carried on the rotating disk 153.

The layer of powder 154 is fed on the disk 153 past the bombarding zone to a collecting dam 175, at which it is recovered through a funnel-shaped collector 176 mounted on the table 152, dropping into a container 177 (or a mold) connected to the collector 176 at the table 152. To facilitate the collection, the upper surface of the disk 153 may be slightly conically shaped. After a predetermined amount of powder 154 is treated, the container 177 is suitably sealed. It will be understood that the treated powder may be directly supplied into a utilization area such as into a compacting or sintering mold.

FIG. 15 shows another form of beam-treatment apparatus constructed in accordance with the present invention. In this system, powder 180 for treatment is supplied from a hopper 181 onto an endless belt 182 carried by a pair of rollers 183 and 184 rotated on respective shafts 185 and 186 within a housing 187 which is evacuated at a vacuum pressure. The powder 180 being carried on the belt 182 is fed to a treatment zone 188 at which it is subjected to the bombardment by an ion beam 190 from an ion gun 191 shown here as integral with the treatment chamber 187. The powder 180 which has been subjected to ion bombardment is shown to drop by gravity for collection in a container 192. The treated powder may be returned to the hopper 181 or directly to the belt 182 for repeated treatment by the system. A suitable metering member 193 may be provided to adjust the width as well as thickness of the powder layer 180 as it is introduced on the belt 182 from the hopper 181. Also, a vacuum connection 194 may be provided through the barrel of the ion gun 191.

The ion-beam source may be of the type shown in FIG. 14 but is here shown diagrammatically comprising a gas supply 195 containing an inert gas such as argon, xenon or the like mentioned earlier. The gas is supplied into a discharge chamber 196 where it is subjected to arc or glow discharge for removal of oxygen or moisture which may be present. The purified gas is introduced through an opening 197 into a plasma chamber 198 formed with a needle electrode 199 and a centrally perforated disk electrode 200 coaxial therewith within a bell-shaped housing. The gas is ionized within the plasma chamber 198 maintained at a vacuum pressure and is extracted through the central opening 201 of the disk electrode 200 into space maintained at a vacuum pressure through the vacuum connection 194, a pressure less than that in the plasma chamber 198. The ions are focused for impingement and accelerated onto the powder 180 through a lens system 202 with a power supply 203 as shown with one terminal electrically connected by a lead 204 with the roller 184 which displaces the belt 182 in contact.

For energy of the ion beam 190, 5 to 100 kev. or more are found suitable to provide an activated powder 180 by stripping contaminates from and imparting substantial vacancies in the lattice of material of the individual particles. The displacement of the belt retainer 182 and the flux of the ion beam 190 are adjusted so that the powder 180 is held in a solid state or without fusion while being bombarded by the ion beam 190. A suitable cooling arrangement may be provided for the powder being treated, although a room temperature is found generally sufficient in carrying out the process.

In FIG. 16 is shown diagrammatically an alternative example of an ion generator 210 suitable to form ions of solid elements for deposition on and bombardment of powder. In this case, a beam of coherent light 211 from a laser means 212 is directed through a transparent window 213 into an ion chamber 214. Within the chamber 214 and in the path of the light beam 211 there is provided a target body 215 of a material containing an element or elements whose ions are to be generated. As the high-energy light beam 211 impinges on the tip of this material 215, atoms or molecules are liberated therefrom by vaporization and form plasma or a cloud 216 of ions adjacent the vaporizing tip 215 between the latter (forming the anode) and a tubular cathodic electrode 217 which forms an extractor electrode by its opening 218. The extracted ions are accelerated as mentioned earlier under a relatively low voltage, say, 3 kv. for deposition on the powder or under a relatively high voltage, say, 30 kv. for formation of lattice vacancies in the powder particles by bombardment.

The invention is further illustrated by the following specific examples.

EXAMPLE I

Nickel powder of a fineness of 250 mesh was activated in argon atmosphere (as in FIG. 1) by exposing it to 60 kv. glow discharge for 5 minutes in accordance with the present invention. To sinter the resulting activated powder in hydrogen atmosphere, a pressure of only about 450 kg./cm.$^2$ and a sintering period of only about 24 minutes were required. In comparison, the non-activated powder required a pressure of 1,850 kg./cm.$^2$ and a sintering period of 43 minutes.

EXAMPLE II

To obtain oxidized powder by heating non-activated 60-mesh beryllium powder in a carbon-dioxide atmosphere, required a heating temperature of about 621° C. Activated powder of the same was prepared, in accordance with the present invention, by exposing it in a hydrogen atmosphere to 85 kv. glow discharge for 5 minutes; this activated powder was oxidized in carbon-dioxide at only about 140° C.

EXAMPLE III

Beryllium powder of 100 mesh fineness was pre-treated by passing it only through the de-gassing stage 81 of FIG. 7 under 10$^{-4}$ mm. Hg evacuation, while eliminating the discharge treatment stage 80. The treated powder was compacted into a green compact and the latter was sintered to a body having 97% density, 10% increase in density over those obtained without the de-gassing treatment.

EXAMPLE IV

Beryllium powder, again 100 mesh, was pre-treated by exposing it to glow and corona discharge through the stage 80 of FIG. 7 and then treated as in Example III. With this powder thus activated, the compaction pressure required was reduced to one-twentieth of the amount formerly required, and the density of the sintered product was elevated to 99%. It has been found that the glow and corona discharge can be altered by electron or ion beam or by impulsive discharge, as described thereinbefore.

EXAMPLE V

Beryllium powder of 100 mesh fineness was activated by exposing it to electrical discharge through the stage 80 of FIG. 7 and thereafter was subjected to an electrostatic field of 150 kv. through the stage of FIG. 9, as it was packed in the mold 112. The packed density of the powder was identical to that obtained with a mechanical press of 1.5 tons/cm.$^2$ pressure. In another instance, beryllium powder of the same mesh was, upon the discharge activation, subjected to electrostatic field of 40 kv. strength. The packed density of the loaded powder in this case was identical to that obtained with a mechanical press of 200 kg./cm.$^2$ pressure.

EXAMPLE VI

For use in fuel cells as electrode material, 400 mesh nickel powder was processed according to FIG. 11 with a shock energy of 11,000 joules, which is about four Mach. It was given three shocks at a distance of ten centimeters and then sintered into a plate one by twenty by twenty milliameters having a denstiy of 70%.

Three hundred mesh silver was given the same shock treatment and also compressed to 70% denity in a plate one by twenty by twenty milliameters.

These plates were then used in the fuel cell of FIG. 12 with the nickel side to oxygen, the silver side to hydrogen, and with potassium hydroxide as the electrolyte. (Calcium oxide was used on both plates prior to their use in the fuel cell, for activation only.) An exact duplicate of the fuel cell employing sintered nickel and silver which were made from the same powder but by ordinary sintering was also made and was found to produce a voltage of 0.9 v. and a current of 120 milliamps in the fuel cell. Under the same conditions the material activated by the shock energy produced a potential of 1.1 volts and a current of 340 milliamps.

In addition to the inert gases named in the examples, nitrogen, helium, neon, krypton, xenon, and admixtures of two or more with each other or with argon or carbon dioxide may be used. Hydrogen is the best reducing gas, when that is desired, especially hot hydrogen. Reduced-pressure air, e.g., near vacuum, can be used. Which gas is best depends partly on the powder being treated. The term metallic powder is intended to include not only actual metal powders but also metal carbides, carbon, other metallic compounds, even in some instances metal oxides, nitrides, sulfides, etc. It will be apparent that the process may be varied to suit the exact material; for example, reducing atmospheres are desirable sometimes and not others, for example where oxides are a desired end product.

EXAMPLE VII

Using apparatus as shown in FIG. 13, titanium powder of particle size of 200 mesh was treated. The powder 154 supplied from the hopper 155 was layered at a width of 5 mm. and a thickness of 0.2 mm. on a tungsten disk 153 of 250 mm. diameter rotated at 2 r.p.m. (two revolutions per minute). The powder 154, as it continuously passed the treatment zone 158, was subjected to bombardment of argon ions projected from the ion gun 160 and then continuously collected into the container 177. In the ion gun 160, the filament heater supply 168 was at 50 volts, and the anode-to-cathode voltage was 250 volts with 5 kilovolts being applied across each lens gap maintained at a vacuum pressure of $10^{-3}$ mm. Hg and ion current at 300 $\mu$a. The pressure within the treatment chamber 1 was $10^{-4}$ mm. Hg. The activated powder was sintered to form a coherent body only for a period ⅔ of that normally required for untreated powder and the elongation of the sintered body from the activated powder was increased two times that of a body sintered from the untreated powder.

EXAMPLE VIII

In hydrogen-addition petroleum desulfurization process, it is common practice to use as catalyzer carrier, particles of metal oxides such as zinc oxide, alumina and magnesia. For example, using these catalyst particles, the sulfur content of a petroleum oil containing 4.2% sulfur can be reduced to 1.2% by contacting hydrogen at a pressure 42 atm. to the oil heated at a temperature of 420° C. In accordance with the present invention, these metal oxide particles were treated, with a system as shown in FIG. 13, by a high-energy beam of argon ions accelerated at 88 kev. and with a current of 2.8 milliamperes. Lattice defects were observed in the treated particles. When these activated particles were used as catalyzer carrier particles in desulfurizing an untreated oil mentioned above, heating the oil only at 312° C. and hydrogen feed at 11 atm. was found sufficient to achieve the same sulfur reduction.

EXAMPLE IX

Titanium powder of 99.3% purity and 300 mesh particle size was treated using an apparatus like that shown in FIG. 15, wherein argon was introduced at a pressure of $10^{-1}$ mm. Hg into plasma chamber 198 where it was subjected to an electric discharge at 160 volts and 25 milliamperes for ionization. The argon ions were extracted from the chamber 198 through the aperture 201 centrally formed in the disk electrode 200 and accelerated under 30 kv. and at 10 microamperes against the titanium powder 180 carried on the moving belt 182. The vacuum pressure within the treatment chamber was maintained at $10^{-5}$ mm. Hg. The treated powder, with imparted lattice vacancies in indivdual particles, was electrically sintered to a coherent body which showed a density of 99.4%, a tensile strength of 24.9 kg./cm.$^2$ and an elongation of 23%. In comparison, a body sintered under the same condition from untreated titanium powder showed 98% density, 16.5 kg./cm.$^2$ tensile strength and 15% elongation.

Ions, when not properly energized, tend to materially adhere on individual particles rather than knocking on substrate atoms and it is found desirable, for the purpose of activation by formation of lattice vacanices, that powder be subjected to bombardment of ions accelerated under at least 5 kv. However, such tendency of adherence is advantageously found useful sometimes, especially when ions are of substance which it is desired to form a coating on the individual particles. Thus, according to this discovery of the invention, it is possible to prepare a highly purified, activated powder of composite particles thereby preparing an alloy product through subsequent sintering. To this end, the discharge electrode system 197, 198 can be made from a desired material with which the surfaces of individual particles of powder are to form alloy layers and a suitable power applied to these electrodes to vaporize and ionize the material. The ions thus formed are subjected to a relatively low acceleration voltage for deposition on the receiving particles. The alloyed particles after removal from the treatment zone are then re-introduced to that zone for activation by a high-energy ion beam as mentioned earlier to form lattice vacancies and distortions here in the alloyed surfaces.

EXAMPLE X

The particles of titanium powder received beryllium layers and were then activated. Argon was introduced at a pressure of $10^{-1}$ mm. Hg into a plasma chamber 198 maintained at a pressure of $10^{-3}$ mm. Hg and there subjected to arc discharge at 160 volts and 25 milliamperes. The electrodes were formed from beryllium. Argon and beryllium ions generated were extracted through a central aperture of 0.1 mm. diameter of the disk electrode and accelerated under 3 kilovolts and at 12 microamperes against the titanium powder 180 of 400 mesh carried on the belt 182. The treatment continued until a beryllium layer of 1.6 to 2.0 micron thickness was formed on each particle. Subsequently, the alloyed powder was subjected to ion bombardment under 30 kilovolts within the chamber 187 maintained at an argon pressure of $10^{-5}$ mm. Hg. The activated powder was placed in a graphite mold and electrically sintered by receiving the passage of an electric current therethrough between a pair of graphite electrodes and under pressures, initially 6 kg./cm.² and finally 500 kg./cm.². The required electric power and sintering period were only 121 kilowatts and six (6) seconds, respectively. The density of the sintered article was 98%. In comparison, untreated titanium and beryllium powders were mixed by convetional procedure requiring considerable lapse of time and, as they were uniformly mixed, the mixture was electrically sintered under the same conditions as used for the activated powder. The resultant sintered body was of only 85% density and the required power and sintering period was 160 kilowatts and 40 seconds, respectively.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A process of packing metallic powder in a mold in a manner to improve its purity and density, comprising
   continuously supplying metallic powder to a purification zone,
   bombarding the powder in a fluidized state in said purification zone and in a non-oxidizing atmosphere with high energy particles chosen from the class consisting of sub-atomic particles, ions, and molecules,
   continuously separating from the powder the impurities that are cleaned from the particle surfaces during the bombarding step, and
   continuously dropping said material form said separating step into a mold and compacting it there.

2. The process of claim 1 wherein the bombarding step comprises positioning the powder in its fluidized state between a pair of electrodes and applying across said electrodes a high-amperage direct current and a low-amperage alternating current to promote high-frequency discharge among the particles.

3. The process of claim 1 wherein a second bombardment step is carried on during the dropping step.

4. The process of claim 1 wherein the treatment includes applying a magnetic force at substantially right angles to the path the powder follows while it is dropping into said mold.

5. The process of claim 1 wherein the powder is bombarded by a beam of electrons after it is in said mold.

6. A method of activating metallic oxide catalyzer carrier particles to improve their catalytic action, comprising
   projecting a beam of high-energy ions from an ion gun and
   bombarding the particles in a vacuum of at least 0.01 mm. Hg with the high-energy beam of ions.

7. The method of claim 6 wherein the metallic oxide particles are chosen from the group consisting of the oxides of aluminum, magnesium, and zinc.

8. The method of claim 6 wherein argon ions are used as the high-energy ions.

9. The method of claim 8 wherein the argon ions are accelerated at about 88 kev. and with a current of about 2.8 milliamperes.

10. A process of activating metallic powder in a manner to improve its purity and density, comprising
    continuously supplying metallic powder to a treatment zone,
    bombarding the powder in said treatment zone and in a non-oxidizing vacuum atmosphere at a pressure below 0.01 mm. Hg with high energy ions at a minimum of 5 kev.

11. The method of claim 10 wherein the bombarding step comprises moving the powder through a beam of said ions at a controlled speed.

12. A process of alloying metallic powder while activating it, comprising
    continuously supplying a metallic powder of a first metal to a treatment zone,
    bombarding the powder in said treatment zone and in a non-oxidizing atmosphere with high energy ions of a second metal and ions of an inert gas, at an energy below 5 kev., to enable adherence of said second metal ions to said first metal particles, until a desired thickness of said second metal is obtained.

13. The process of claim 12 wherein the treatment is followed by then bombarding the resultant particles with ions of gas alone at an energy well above 5 kev.

14. The process of claim 13 wherein the bombarding step is followed by sintering the metal particles.

15. The process of claim 12 wherein said first metal is titanium and said second metal is beryllium.

16. The process of claim 15 wherein said desired thickness is 1.6 to 2.0 microns.

References Cited

UNITED STATES PATENTS

| | | | |
|---|---|---|---|
| 3,464,790 | 9/1969 | Schrader et al. | 204—157.1 |
| 3,355,279 | 11/1967 | Ishibashi | 75—.5 |
| 3,485,771 | 12/1969 | Horvath | 252—410 |
| 3,247,014 | 4/1966 | Goldberger et al. | 204—164 |
| 3,104,216 | 9/1963 | Ruskin | 204—157.1 |
| 3,105,024 | 9/1963 | Schutze et al. | 204—157.1 |
| 3,537,966 | 11/1970 | Steinberg et al. | 204—157.1 |

CARL D. QUARFORTH, Primary Examiner

B. HUNT, Assistant Examiner

U.S. Cl. X.R.

75—.5 R; 134—1; 204—164; 209—3, 22; 252—461, 463, 475.